Dec. 3, 1957 R. W. PAGE 2,814,822
ADJUSTABLE WINDOW WIPING SQUEEGEE
Filed May 24, 1956
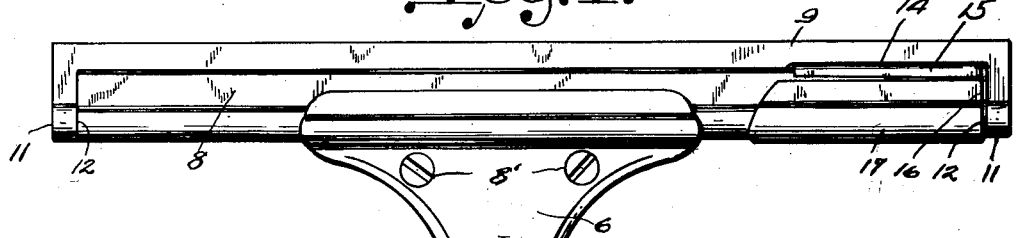
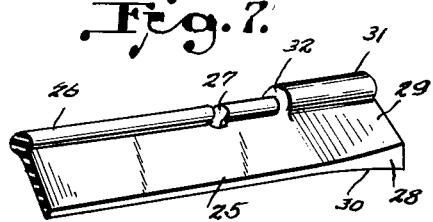
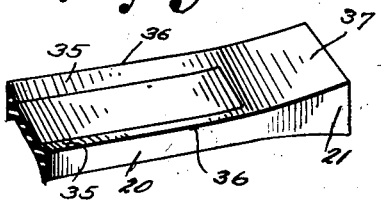
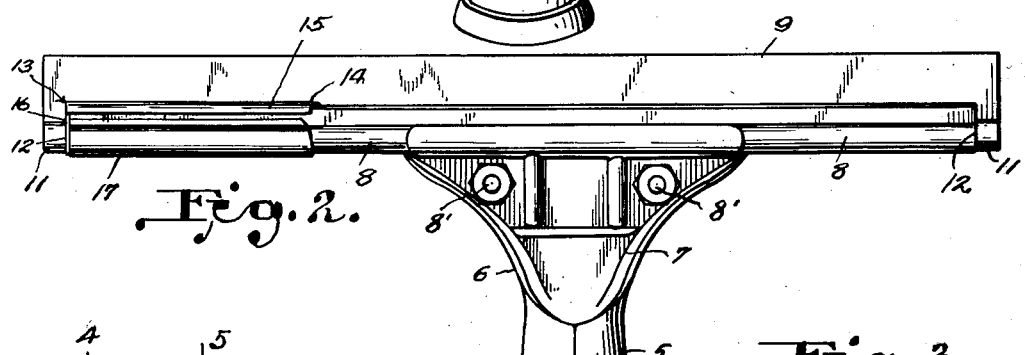
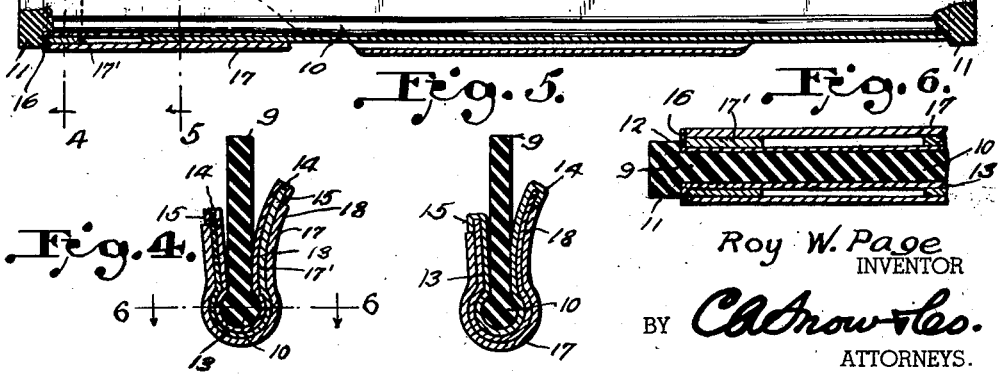
Roy W. Page
INVENTOR
BY *C. A. Snow & Co.*
ATTORNEYS.

United States Patent Office 2,814,822
Patented Dec. 3, 1957

2,814,822
ADJUSTABLE WINDOW WIPING SQUEEGEE
Roy W. Page, Chicago, Ill.
Application May 24, 1956, Serial No. 587,154
5 Claims. (Cl. 15—245)

This invention relates to squeegee construction, the primary object of the invention being to provide a squeegee of improved usefulness, adaptability, efficiency and durability.

Another object is to provide a squeegee having the holder and the rubber blade so constructed and assembled as to permit variation of the effective wiping width without exchange of rubber blade and without loss of efficiency.

A further object is to provide a squeegee provided with means for maintaining the rubber blade in its adjusted position in the holder without possibility of relative longitudinal displacement thereof.

Still another object is to provide a squeegee having a rubber blade with end portions of such shape that efficient wiping is ensured along the entire length of the rubber blade whereby to prevent the common disadvantage of less efficient wiping in the end areas of the rubber blade.

Another object is to provide a squeegee provided with a rubber blade having enlarged end portions of such configuration as to tend to squeeze the water on a window towards the main middle portion of the rubber blade, away from the end portions.

A further object is to provide a squeegee in which the main portion of the rubber blade fits snugly in the holder while the end portions of the rubber blade are enlarged to such an extent that insertion of the rubber blade in the holder by sliding it in from one end of the holder in the customary way would be impossible, said rubber blade being provided with a transverse incision comparatively close to one end thereof so that the rubber blade can be inserted in the holder by sliding it in with the edge of the incision on the longer part as the leading edge, then stretching the rubber blade enough to enable the opposite edge of the incision to be inserted from the opposite end of the holder, and allowing the rubber blade to contract longitudinally by its own elasticity until it occupies the proper position in the holder.

Another object is to provide a squeegee having a rubber blade with enlarged longitudinal working edges insuring a smoother and more efficient operation and longer useful life of the rubber blade.

A still further object of the invention is to provide a holding frame in the form of a channel member to which the squeegee blade is secured, the blade being removably mounted so that it may be readily and easily replaced when worn or otherwise rendered inoperative.

Other and further objects and advantages of the invention will be hereinafter described and the novel features thereof defined in the appened claims.

Referring to the drawing:

Fig. 1 is an elevational view of a squeegee constructed in accordance with the invention.

Fig. 2 is an elevational view of the rear side thereof.

Fig. 3 is a longitudinal sectional view through the squeegee and support.

Fig. 4 is a sectional view taken on line 4—4 of Fig. 3.

Fig. 5 is a sectional view taken on line 5—5 of Fig. 3.

Fig. 6 is a sectional view taken on line 6—6 of Fig. 4.

Fig. 7 is a fragmental perspective view illustrating one end of a squeegee blade of modified form.

Fig. 8 is a fragmental perspective view of a modified form of squeegee blade of further modified form.

Referring to the drawing in detail, the device comprises a handle 5 which is hollow to receive one end of a removable handle should it be desired to use the squeegee in remote areas.

As better shown by Fig. 2 of the drawing, the handle is formed with a wide end 6 and a clamping plate 7 cooperating therewith, the clamping plate 7 being secured to the wide end 6, by means of the bolts 8'. The wide end and clamping plate are formed with curved portions to conform to the curvature of the back of the holding frame 8 which is in the form of a channel member, the channel member being designed to receive the squeegee blade, indicated by the reference character 9.

The squeegee blade which forms an important feature of the invention, is formed preferably of rubber, one longitudinal edge thereof being thickened and rounded at 10 to fit within the curved portion of the channel member or holding frame 8, thereby to hold the squeegee blade in its proper operative position within the holding frame or channel member 8.

The blade as shown by Figure 8 of the drawing is also formed with enlarged longitudinal edges 35 that are tapered providing feather-like edges 36 the enlarged ends causing the cleaning fluid used in washing a window to be directed inwardly towards the center of the blade away from the end portions.

As shown by the drawing, the squeegee blade 9 is formed with enlarged ends 11 that provide shoulders 12.

Slidably mounted on one end of the holding frame or channel member 8, is an inner channel section 13 which fits over the inner edge 10 of the squeegee blade 9 with its marginal edges bent rearwardly at 14 providing flanges 15 that overlie the edges of the holding frame or channel member 8 for sliding movement longitudinally over the holding frame or channel member 8.

Formed at the outer end of the inner channel section 13 is an outwardly extended flange 16 that normally rests against the shoulder 12 of the squeegee balde mounted within the holding frame or channel member 8, as better shown by Fig. 5 of the drawing.

Mounted for sliding movement longitudinally of the holding frame or channel member 8, is an outer channel section 17 carrying the spacer 17' that has its outer end abutting the flange 16 so that movement of the outer channel section 17 in outward direction, will cause a corresponding movement of the inner channel section 13, with the result that the squeegee blade is stretched to adapt the squeegee blade for use in wiping or cleaning a pane of a particular size. It might be stated that these wipers are designed for cleaning a window by a single stroke of the squeegee blade over the window.

The frictional contact between the inner and outer channel sections with the holding frame or channel member 8, is such that the squeegee blade will be held in its adjusted position without resorting to the use of securing mechanism other than the frictional contact.

It might be further stated that the flanges of the holding frame or channel member, are in substantially parallel spaced relation with respect to each other, one of the flanges being curved outwardly at 18 so that the squeegee blade 9 held within the channel member, may stretch laterally, but will be restricted to such movement, as will insure the proper cleaning operation, as the squeegee is drawn across the surface to be wiped therewith.

In the form of the invention as shown by Fig. 7, the squeegee blade is of modified form, and comprises the main blade portion 25 formed with a bead 26 along one longitudinal edge thereof, the bead 26 having a cutout portion 27 to lend flexibility to the blade proper and permit of the blade stretching to the desired length upon movement of the outer channel section 17 in making the adjustment to lengthen the blade.

One end of the blade is thick as at 28 and presents inclined upper and lower surfaces 29 and 30 respectively to strengthen the blade at this end.

The bead 26 is also provided with an enlarged end portion 31 that presents a shoulder 32 at the inner end thereof, which shoulder is engaged by the outer channel section 17 to stretch the blade 25 as the channel 17 is extended.

By providing the cutout portion 27, the bead 26 is divided at a point adjacent to the thickened end 28 thereof, and since the thickened portion, because of its size, cannot be fed into the channel 8, the thickened end of the blade may be bent laterally out of the way, and the end of the bead 26 at the cutout portion and which forms a part of the main portion of the blade, may now be threaded into the channel 8 and stretched until the cutout portion 27 reaches the end of said channel 8, whereupon the end of bead 26 forming a part of the thickened end of the blade may now be directed into the end of the channel member 8 in the opposite direction. The end of the blade separated by the cutout portion is now released and permitted to contract into the channel member where it is firmly held by frictional contact therewith.

From the foregoing it will be seen that due to the construction shown and described, I have provided a window wiping squeegee of an adjustable nature, whereby the rubber squeegee blade held therein may be adjusted for length to adapt the squeegee effectively in wiping a window of a particular size.

In the form of the invention as shown by Fig. 8 of the drawing, the squeegee blade which is indicated by the reference character 20 has portions of its side faces along its longitudinal edges beveled inwardly at 35 providing fine wiping edges 36. The blade 20 also has its ends formed with enlargements 21 that present inwardly inclined surfaces 37 at the outer ends of the squeegee blade, the enlargements providing stops to set up a binding action between the squeegee blade and innermost channel member, when this type of squeegee blade is used, so that when the channel sections are moved longitudinally of the holding frame or channel member in an outward direction, the ends of the squeegee blade will become wedged at the end of the inner channel section with the result that the squeegee blade is stretched to the desired length for use on a window of a particular width.

The frictional contact between the channel sections and the channel member of the main holding frame will be such as to prevent the squeegee blade from retracting so that the adjustment of the squeegee blade will be maintained during the operation of the device to wipe a window.

It will also be seen that the inclined surfaces 35 of the blade will tend to squeeze the water on a window towards the center of the squeegee blade, away from the end portions.

Further, it is within the scope of the invention to provide a rubber squeegee blade provided with an outer wear skin or layer of rubber of contrasting color, so that unusual wear of the outer skin or layer of rubber may be readily detected by visual inspection, and replacement or repair of the squeegee readily made.

Having thus described the invention what is claimed is:

1. An adjustable squeegee comprising a handle, a channel member secured to said handle, a rubber squeegee blade held within said channel member, enlargements formed in the ends of said squeegee blade, an extensible channel section slidably mounted on said channel member, one end of said extensible channel section engaging the enlargement at one end of said squeegee blade stretching said squeegee blade as said extensible channel section is moved longitudinally of said channel member in one direction, increasing the length of said squeegee blade for use on a window of a particular width.

2. An adjustable squeegee comprising a handle, a main channel member secured to said handle, a squeegee having enlargements at its ends providing stops, held within said channel member, an inner channel section slidably mounted within one end of said channel member in which one end of said squeegee blade is held, a second channel section mounted for sliding movement longitudinally of said main channel member, a flange extending laterally from one end of said inner channel section engaged by one end of said second channel section, moving said inner channel section longitudinally of said main channel member, and said channel section adapted to move against a stop adjacent thereto stretching said squeegee blade and adjusting the length thereof as said channel sections are moved along the main channel member.

3. An adjustable squeegee comprising a handle, a channel member secured to one end of said handle in transverse relation with respect thereto, an inner slidable channel section secured at one end of said channel member and adapted to move longitudinally thereof, the longitudinal edges of said channel section constituting continuations of the edges of said channel member, a rubber squeegee blade mounted within the channel member with one end thereof secured within said channel section for movement therewith, and an outer channel section movable over the outer surface of said channel member for moving said inner channel section outwardly, stretching the squeegee blade to lengthen the same.

4. An adjustable squeege comprising a handle, a channel member secured at one end of the handle and disposed transversely with respect thereto, inner and outer channel sections mounted on said channel member adjacent to one end thereof, a rubber squeegee blade mounted within said channel member and having one of its ends disposed within the inner channel section for movement therewith, and mechanism for connecting said inner and outer channel members whereby movement of said outer channel member effects movement of said inner channel member stretching said squeegee blade, lengthening the squeegee blade.

5. In a squeegee, a holder having a channel, a squeegee blade having an enlarged end and having a bead extending along one longitudinal edge thereof, said bead having a cutout portion dividing said bead adjacent to the enlarged end of said blade, the end of said bead adjacent to the cutout portion adapted to be bent laterally out of the way for positioning said bead in said channel, said enlarged end of said blade and bead section adapted to be stretched beyond the end of said holder, and said bead section of the enlarged end adapted to be directed into said channel end and released for contraction into said channel, securing said blade by frictional contact with the wall of said channel.

References Cited in the file of this patent

UNITED STATES PATENTS

| | | |
|---|---|---|
| 629,851 | Glen | Aug. 1, 1899 |
| 2,123,638 | Steccone | May 12, 1938 |
| 2,376,098 | Steccone | May 15, 1945 |
| 2,591,301 | Schacht | Apr. 1, 1952 |
| 2,663,889 | Fuglie | Dec. 29, 1953 |